(12) United States Patent
Rehberg et al.

(10) Patent No.: US 6,320,134 B1
(45) Date of Patent: Nov. 20, 2001

(54) CABLE RETAINER OF PLASTICS FOR VEHICLES

(75) Inventors: Karsten Rehberg, Igersheim; Jens Sturies, Wettstetten, both of (DE)

(73) Assignee: ITW-ATECO G.m.b.H., Rottingen (DE)

( * ) Notice: Subject to any disclaimer, the term of this patent is extended or adjusted under 35 U.S.C. 154(b) by 0 days.

(21) Appl. No.: 09/332,047

(22) Filed: Jun. 14, 1999

(30) Foreign Application Priority Data

Jun. 24, 1998 (DE) .............................................. 198 28 073

(51) Int. Cl.⁷ ...................................................... H01B 7/00
(52) U.S. Cl. ................................................................ 174/135
(58) Field of Search ......................... 248/68.1; 411/182, 411/904; 174/135; 24/453

(56) References Cited

U.S. PATENT DOCUMENTS

| | | |
|---|---|---|
| 3,664,617 | 5/1972 | Fenwick . |
| 4,850,773 | 7/1989 | Asami . |
| 4,865,280 | 9/1989 | Wollar . |
| 5,040,752 | 8/1991 | Morrison . |
| 5,362,018 | * 11/1994 | Darr et al. .......................... 248/74.3 |

FOREIGN PATENT DOCUMENTS

| | | |
|---|---|---|
| 37 41 921 | 6/1989 | (DE) . |
| 0 735 286 | 10/1996 | (EP) . |
| 2 243 399 | 10/1991 | (GB) . |

* cited by examiner

*Primary Examiner*—Shawn Riley
(74) *Attorney, Agent, or Firm*—Lowe Hauptman Gilman & Berner, LLP

(57) ABSTRACT

A cable retainer made of plastics and being useable for vehicles having a vehicle body is disclosed. The cable retainer has a hollow shank adopted to be inserted into a hole of the vehicle body. The shank has at least one outer engagement portion which is radially deformable and grips behind an edge of the hole if the shank is inserted into the hole. The shank is adapted to be pushed onto a stud of the vehicle body in cases where the stud has a plurality of grooves or a thread. The shank further has an inner engagement portion which is radially deformable to engage the groove or thread of the stud. A retaining portion is connected to one end of the shank and extends in a direction tranverse to the shank axis. A strip encircling a cable and the retaining portion is provided to complete the cable retainer.

13 Claims, 2 Drawing Sheets

CABLE RETAINER OF PLASTICS FOR VEHICLES

BACKGROUND OF THE INVENTION

The invention relates to a plastic for vehicles.

A number of cables are installed within automobiles to supply power to various displays buttons, etc. These cables, cable bundles or cable looms must be fastened to the associated car body parts in a suitable manner. Preferably with minimal assembly effort. The means applied for this must be able to be manufactured at cost. Furthermore, it is important that the fastening is of a manner such that the cables or cable bundles are securely attached and are not loosened by vibration, wherein a formation of noise in any case is to be avoided. The attachment of the cables is also to be in a manner such that they do not suffer any damage over a long period of operation.

It is to use so-called cable strips to retain cables together into a bundle. The cable bundles consist usually of a toothed strip which may be inserted into a lock arranged at the other end of the strip, to provide adjustable locking in stepped portions. It is also known to connect such cable strips with an expanding rivet or with another fastening element, in order to fasten the cable to the allocated car body part. For this purpose the expanding rivet or a similar fastening part is lockingly inserted into a hole mounted at the predetermined location.

Cable retainers are known which provide a similar fastening possibility to the car body and which comprise a cuff-like portion for enclosing one or more cables.

Alternatively, a fastening hole(s) in the vehicle car body can receive one or more so-called studs. Each stud may comprise a thread-like or annular groove. Fastening elements of plastic are inserted onto the studs in a sleeve-like manner, wherein an engagement with the groove of the stud is effected in order to attach the fastening element family on the car body.

BRIEF SUMMARY OF THE INVENTION

It is the object of the invention to provide a cable retainer which is suitable for the attachment in fastening holes as well as on studs.

The cable retainer according to the invention comprises a hollow shank which on an outer side comprises at least one radially deformable outer engagement portion which grips behind the edge of a hole of the vehicle car body when the shank is inserted into the hole. The shank on the inside further comprises at least one radially deformable inner engagement portion which engages into the thread or other groove of a stud of a vehicle car body when the shank is pushed onto the stud. The fastening holes in the car bodies usually have a predetermined diameter. It can therefore be realized without difficulties to select the dimensions of the shank on the inside and outside such that the shank may be incorporated or mounted in predetermined fastening holes as well as on a predetermined stud and may be securely fastened.

The shank at one end is connected to an elongate retaining portion extending transversely, around which a cable strip may be wrapped. A known cable strip as described above may be used. Alternatively, a tape may also be provided which is laid around the cable or cable bundle with a simultaneous wrapping around of the retaining element. The cable retainer according to the invention has the advantage that it is designed for two differing fastening possibilities. This leads to a reduction in the variants of the fastening means for the manufacturer of the vehicle.

According to one formation of the invention the retaining portion at at least one end comprises a projection extending approximately parallel to the shank. Such a projection reduces slippage of the strip over the free end of the retaining portion and thus release of the strip from the cable retainer.

The retaining portion may be plate-shaped or may be formed concavely for forming a channel or a duct for the secured accommodation of the cable or the cable bundle.

To bias the cable strip wrapped around the retaining portion according to one formation of the invention it is provided for the retaining portion to comprises a resiliently yielding biasing portion on the same side as the shank, over which the strip extends, wherein the biasing portion exerts a biasing force on the strip. The biasing portion may be formed as a U-shaped portion which is formed as one piece on the lower side of the retaining portion, wherein the strip bears against the web of the U-shaped biasing portion. The web may be deformed within limits and be biased by the strip on wrapping around so that the strip is constantly held with biasing. This above all is important when it is not possible to pull the strip so tightly around the retaining portion that an unmovable fastening of the cable is achieved. The web of the U-shaped biasing portion according to a further formation of the invention is arcuate in the direction of the retaining portion. By way of this at the same time a lateral securement is created.

To form the shank there are various design possibilities. According to one embodiment of the invention, the shank on oppositely lying sides comprises prong-shaped snapping portions which, with their ends distal to the retaining portion, are connected on the shaft, and with their free ends facing the retaining portion project somewhat beyond the outer contour of the shank in order to grip behind the edge of the hole. On the inner side the shank comprises proximate to the connection in each case, oppositely lying engagement teeth with a concave engagement edge, that extend radially inwards, and when inserting the shank onto the stud, deform so far that the teeth may slide over the grooving of the stud until they engage into the grooving at a predetermined location. The snapping prongs or snapping fingers preferably comprise at their free end a shoulder which engages with the edge of the hole when the shank is inserted into the hole. The engagement tooth on the inner side of the shank extends preferably obliquely upwards into the inside of the shank so that they act in the manner of a hook barb such that on insertion onto a stud they may be relatively easily deformed, yet oppose the pulling of the shank from the stud with a high resistance.

Another embodiment of the invention provides for the shank to comprise on the outside, on oppositely lying sides, a row of approximately radially flexible snapping prongs, this row extending parallel to the axis of the shank. Such a formation of a fastening element is known per se. Such a fastening element is for example known as a spiked clip or pine-tree clip. It has the advantage that the engagement depth of the shank in the fastening hole is formed variably over a large range. It has the further advantage that on retraction not only the resistance of one snapping prong, but all snapping prongs which lie above the snapping prong located in engagement is to be overcome. On the inside of the shank likewise, diametrically oppositely lying engagement teeth may be provided, which are preferably formed flexible in order to yield on pushing on a stud. Preferably in each case an engagement tooth is aligned radially to a row of engagement teeth.

BRIEF DESCRIPTION OF THE DRAWINGS

Embodiment examples of the invention are hereinafter described in more detail by way of the drawings.

DETAILED DESCRIPTION OF THE INVENTION

Figure 1:
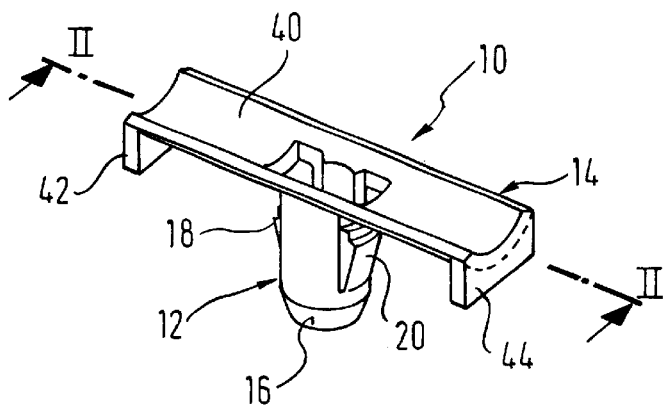
FIG. 1 is a perspective view of a first embodiment form of a cable retainer according to the invention.
Figure 2:
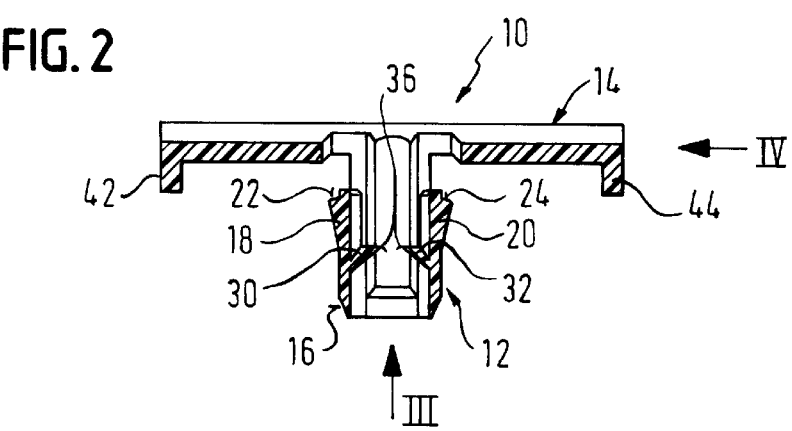
FIG. 2 is a section through line II—II of FIG. 1.
Figure 3:
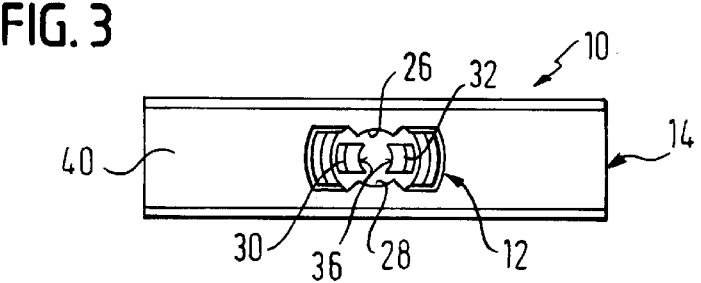
FIG. 3 is a bottom view of the cable retainer according to FIG. 2, in the direction of arrow III.
Figure 4:
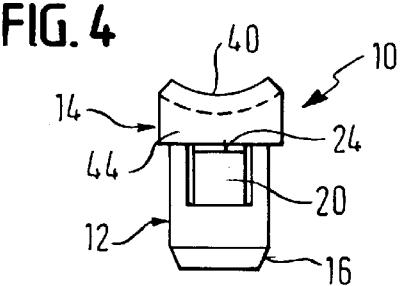
FIG. 4 is a lateral view of the cable retainer according to FIG. 2 in the direction of arrow IV.

A cable retainer according to FIGS. 1 to 4 comprises a shank 12 and a retaining portion 14. The shank is formed cylindrically or sleeve-like with a conical introduction portion 16 at the lower end. On oppositely lying sides of the shank 12 there are formed latching prongs or fingers 18, 20 which at the lower end are connected onto the shank 12, but extend obliquely upwards and outwards. The outer contour of the prongs 18, 20 is conical. The snapping prongs 18, 20 comprise a shoulder 22 and 24 respectively which grip the edge of a fastening hole which is not shown, when the shank 12 is introduced into the fastening hole.

The inside of the shank 12 comprises concavely arcuate guiding portions 26, 28 lying opposite, which are adapted to the outer diameter of a stud which is not shown. On oppositely lying sides, rotated about 90° to the guiding portions 26, 28, there are formed two diametrically oppositely lying engagement teeth 30, 32. As is deduced from FIG. 2 the engagement teeth 30, 32 extend inwardly and upwardly, in the manner of a hook barb, and have a circular arc shaped engagement edge 36 at their free ends. The distance of the engagement edges 36 is somewhat less than the diameter of the stud so that on pushing on the shank 12 onto the stud, which is not shown, the engagement teeth 30, 32 are swung out upwardly and the engagement edges 36 slide over the grooving of the stud. After completion of the pushing-on movement the engagement edges 36 then engage into a corresponding part of the grooving in order to securely retain the shank 12 on the bolt. On account of the formation of the teeth 30, 32 in the manner of a hook, on retraction of the shank from the stud a considerable resistance is counteracted.

The retaining portion 14 is formed of plastic as one piece with the upper end of the shank 12 comprising a groove-like portion 40 extending on both sides of the shank 12, to receive a cable or a cable bundle. At ends of portions 40 their are projections 42, 44 facing downwards. Around the cable bundle or the cable (not shown) there is wrapped a cable strip or a tape which at the same time is also laid around the retaining portion 14. In this manner the cable or the cable bundle is fastened on the retainer 10. The projections 42, 44 prevent a lateral sliding off of the attachment.

Figure 5:
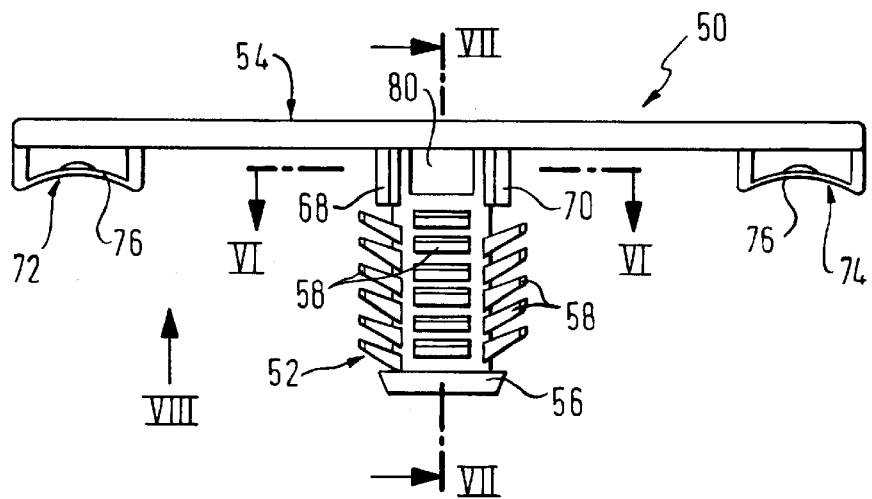
FIG. 5 is a front view of a second embodiment of a cable retainer according to the invention.
Figure 6:
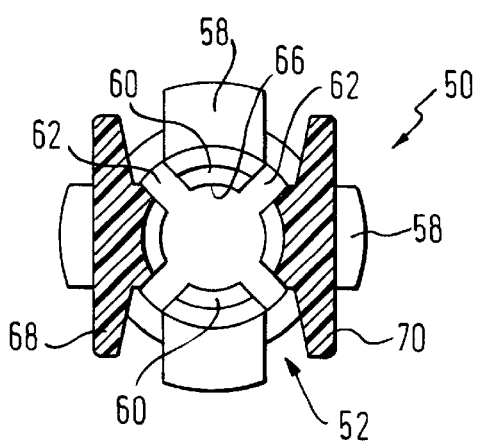
FIG. 6 is a section through the cable retainer according to FIG. 5, taken along the line VI—VI.
Figure 7:
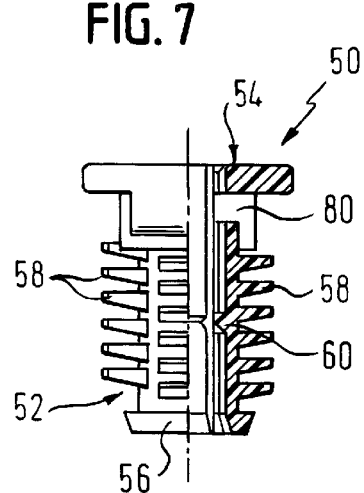
FIG. 7 is a section through the cable retainer according to FIG. 5, taken along the line VII—VII.
Figure 8:
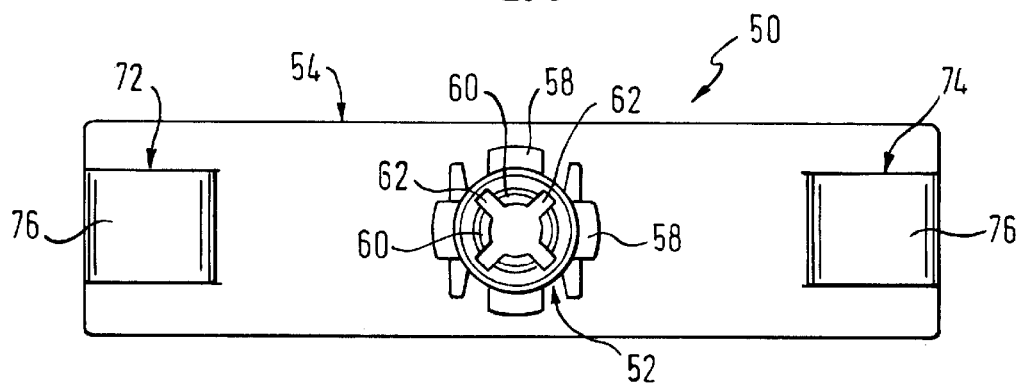
FIG. 8 is a bottom view of the cable retainer according to FIG. 5, in the direction of arrow VIII.

A cable retainer 50 according to FIGS. 5 to 8 comprises a shank 52 and a retaining portion 54. The shank 52 is sleeve-shaped or cylindrical in its basic construction and comprises a conical free introduction end 56, and is provided with four rows of flexible snapping prongs or engagement teeth 58 which extend radially outwards and a little obliquely upwards. There may also be provided only two rows of engagement teeth (not shown.) The rows of engagement teeth 58 in the circumferential direction are arranged displaced to one another by in each case 90° and run approximately parallel to the axis of the shank 52. Such an outer contour of a shank of a fastening element is known per se. It is known under the term spiked or pine-tree clip. With such a formation the shank 52 may be attached in a fastening hole over a variable depth.

Within the shank 52 there are arranged engagement teeth 60 which are arranged in a circumferential distance of 90° between which there lie reliefs 62 so that the engagement teeth on placing the shank onto a stud yield and engage into a predetermined groove. For this purpose the concave engagement edge 66 of the engagement teeth 60 is arranged at a distance to the oppositely lying engagement edge 66 which is smaller than the outer diameter of the stud.

At the upper end the shank 52 is connected to the retaining portion 54 extending on both sides of the shank 52 transversely thereto via web-like connection portions 68, 70.

They serve as a rotational securement on assembly of the retainer in a square hole. An opening 80 in the shank below the retaining portion may serve to accommodate a cable strip (not shown) or to strike the cable retainer laterally on a threaded bolt. The retaining portion 54 consists essentially of an elongate rectangular plate which on the lower side comprises U-shaped biasing portions 72, 74. The biasing portions 72, 74 connected as one piece to the retaining portion 54 at the lower side of the plate at the ends comprise a web 76 which is curved concavely towards the plate. If the cable strip or tape externally is guided over the web 76 then it is securely held by the curvature. The deformation of the web 76 or the arms which occur with a certain tension produces a biasing on the cable strip or the tape. It is however also possible to guide a cable strip or tape through the eyelet which is formed by the biasing portion 72, 74. In this case the web 76 may serve for bearing with tension against the strip or tape in order by way of this to prevent a slipping.

What is claimed is:

1. A cable retainer made of plastics and being usable for vehicles having a body, comprising
    a hollow shank portion (12, 52) adapted to be inserted into a hole of the vehicle body, the shank portion (12, 52) having at least one outer engagement portion which is radially deformable and grips behind an edge of the hole if the shank is inserted into the hole, the shank (12, 52) being adapted to be pushed onto a stud of the vehicle body which has a plurality of grooves or a thread, the shank further having an inner engagement portion (36, 60) which is radially deformable and engages a groove or the thread if the shank is pushed onto the stud,
    a retaining portion (14, 54) connected to one end of the shank portion (12, 52) and extending transverse to the axis of the shank portions and
    a strip for encircling a cable and the retaining portion (14, 54).

2. The cable retainer of claim 1, wherein the retaining portion (14, 54) extends beyond both sides of the shank (12, 52).

3. The cable retainer of claim 1, wherein at least one end of the retaining portion (14) has a projection (42, 44) extending approximately parallel to the shank.

4. The cable retainer of claim 1, wherein the retaining portion has a resilient biasing portion on the same side as the shank, the biasing portion biasing the strip extending over the biasing portion.

5. The cable retainer of claim 4, wherein the resilient biasing portion is an approximately U-shaped biasing portion (72,74) integrally formed by the retaining portion (54), with the strip engaging a web of the U-shaped biasing portion (72, 74).

6. The cable retainer of claim 5, wherein the web (76) of the biasing portion (72, 74) is arcuately formed towards the retaining portion (54).

7. The cable retainer of claim 1, wherein the retaining portion (54) is plate-shaped.

8. The cable retainer of claim 1, wherein the retaining portion (72) has a receiving channel for the cable arcuate in cross section.

9. The cable retainer of claim 1, wherein the shank (12) has prong-shaped snapping portions (18, 22) on opposite sides which are connected to the shank (12) with its end opposite to the retaining portion (14), the free ends thereof facing the retaining portion normally extending beyond the outer contour of shank (12), the snapping portions are gripping behind the edge of the hole, and wherein the shank (12) has a flexible snapping tooth (30, 32) on the inner side adjacent to the connection of the prong portions (18, 20), the snapping tooth (30, 32) having a concave engagement edge (36).

10. The cable retainer of claim 9, wherein the snapping tooth (30, 32) extends upwardly towards the retaining portion (14) and has a relatively sharp engagement edge (38).

11. The cable retainer of claim 1, wherein on opposite sides of shank (52) rows of radial flexible snapping prongs are provided, the rows extending parallel to the shank axis (Igel).

12. The cable retainer of claim 11, wherein the shank (12) has engagement teeth (30, 32) on opposite inner sides, the teeth extending radially inwardly and having a concave engagement edge (66).

13. The cable retainer of claim 12, wherein the engagement teeth (30, 32) are radially aligned the rows of prongs (58).

* * * * *